United States Patent Office 3,114,605
Patented Dec. 17, 1963

3,114,605
PROCESS FOR THE PRODUCTION OF
BORON PHOSPHIDE
Bobbie D. Stone, Miamisburg, Ohio, assignor to Monsanto Chemical Company, St. Louis, Mo., a corporation of Delaware
No Drawing. Filed June 29, 1959, Ser. No. 823,329
7 Claims. (Cl. 23—204)

The present invention relates to a new method for the production of boron phosphide as a crystalline composition of matter.

It is an object of this invention to provide a crystalline form of boron phosphide in the form of a well-crystallized, hard, thermally stable and chemically inert material. It is a further object of the invention to produce a single crystal form of boron phosphide in which the crystals are unusually large.

It is a further object of the invention to produce n-type crystals of boron phosphide for use in electronic applications.

It is a still further object of this invention to produce crystalline boron phosphide by a vapor phase process. Further objects and advantages of the invention will be apparent from the following description.

The crystalline form of boron phosphide is prepared by a reaction in the gaseous phase at elevated temperatures between a volatile boron oxide and elemental phosphorus. Examples of volatile boron oxides include boron suboxide in the various polymeric forms and having the general formula $(BO)_x$ where $x$ is an integer and particularly the most common type having the formula $B_2O_2$. In carrying out the process of the present invention the gaseous suboxide is introduced into a reaction zone where a stream of gaseous phosphorus is also introduced. The relative proportions between the two constituents is not critical, although the reaction for the production of the compound BP utilizes 1.4 gram atoms of phosphorus per gram atom of boron in the boron suboxide. However, in view of the cost and difficulty of obtaining the volatile boron oxides, it is generally desirable to operate with an excess of the phosphorus in order to insure the completion of the reaction with the utilization of all of the boron which is charged to the system. It is also desirable that the partial pressure of phosphorus be at least as great as the decomposition pressure of crystalline boron phosphide at the operating temperatures.

The boron oxides in a volatile, gaseous form are charged directly to the reaction zone. In order to provide a source of $B_2O_2$ for this purpose, a number of chemical reactions may be employed. For example, a preliminary zone may be provided with a mixture of boric oxide, $B_2O_3$, together with a reducing element such as elemental boron, carbon, aluminum, or silicon. In the case where carbon, aluminum or silicon is used as the reducing element, boric oxide, $B_2O_3$, must be present in excess over the stoichiometric quantity of the reducing element, but this condition is not necessary when boron is the reducing element. At elevated temperatures, such as at about 1,400° C., boric oxide is reduced to provide the desired suboxide $B_2O_2$ for use in the present process. However, the combination of source materials of $B_2O_3$ plus elemental boron constitutes a preferred starting material in order to obtain the $B_2O_2$ which actually takes part in the present reaction. The preferred composition of this mixture is one in which the atomic ratio of boron to oxygen is between 2 and 4 for the entire mixture.

It is advantageous also to employ a carrier gas for the introduction of the boron suboxide and the phosphorus into the reaction zone. An inert gas such as argon, helium or neon is effective for this purpose. Such a gas is passed through the volatilization zone for the respective boron oxide and/or the phosphorus source as independent streams which are then comingled in the reaction zone.

The reaction temperature which has been found to be effective for the production of crystalline boron phosphide, and particularly the single crystal type of boron phosphide, including the n-type product, is from 1,000° C. to 1,800° C., a preferred range being from 1,200° C. to 1,600° C. The pressure on the system is not a critical variable so that the reaction may readily be conducted at atmospheric pressure as well as at super atmospheric pressures, for example, 5 atmospheres or more. However, vacuum conditions are also feasible such as at 0.5 atmosphere total pressure. However, the partial pressure of phosphorus is desirably maintained at least as great as the decomposition pressure of crystalline boron phosphide.

A tubular reactor is convenient in conducting the present method; for example, a Y-tube system in which two of the arms are respectively employed for the introduction of the boron suboxide and of the elemental phosphorus source. The third arm then serves to withdraw the exit gases from the reaction system and to serve as a collection point for the crystalline boron phosphide. The boron phosphide is precipitated from the vapor phase at the reaction temperature, a slow rate of deposition being desirable in order to facilitate the precipitation of crystalline boron phosphide in the single-crystal form of the n-type electronic grade of boron phosphide suitable for use in the manufacture of semi-conductor devices. Various modifications of the tubular system may be provided, although it is desirable that the reactants should not meet at a lower temperature, but should be brought together directly in the reaction zone maintained at the elevated temperatures described above.

In addition to the production of single crystals, the present invention is also useful for the manufacture of other forms of crystalline boron phosphide, such as a polycrystalline product. In such cases, the phosphorus stream may be passed directly over the hot bed of boric oxide mixed with boron or other reducing agent. In this modification the vapor-phase reaction takes place throughout the porous bed and crystalline boron phosphide is deposited throughout the bed. The product may then be collected by dissolving away unreacted materials by means of a suitable acid leach such as a mixture of concentrated nitric and hydrofluoric acids. In this embodiment of the invention, the reaction apparently goes through an intermediate stage in which the boric oxide and the boron first form boron suboxide which is the primary reacting species since it reacts with phosphorus far more rapidly than does boron itself.

Boron phosphide as herein prepared is a highly crystalline material with a cubic crystalline structure having a unit cell length of about 4.537 Angstrom units. Its hardness lies above 9 on Moh's scale (diamond=10). It has been found that it will scratch and abrade quartz, porcelain, agate, cemented tungsten carbide and sapphire. The crystalline material is quite light, having a particle density by the pycnometer method of 2.94 (theoretical, 2.97).

The crystalline form of boron phosphide is resistant to oxidation when exposed for two minutes to an oxy-hydrogen flame, giving a temperature of 4,000° F. In addition it has been found that a sample at this temperature can be subjected to an oxygen jet from a cutting torch without appreciable deterioration of the crystalline boron phosphide.

While this material is somewhat less resistant to oxidation while it is being heated up to such high temperatures, the provision of a neutral or reducing atmosphere overcomes any such tendency towards deterioration. When exposed to a flame at 2,100° F. in air, it will not burn. A thin coating apparently forms on the exposed surface, which coating protects the boron phosphide at these high temperatures. The melting point of this material is extremely high, but from theoretical considerations it should melt at a temperature greater than about 5,400° F.

Cubic crystalline boron phosphide is not attacked by any liquid reagent which has been tried. It is completely stable to boiling nitric acid and to boiling aqua regia.

The crystalline boron phosphide prepared by the present process is a semiconductor and exhibits n-type conduction. In this type of semiconductor, current is carried by electrons rather than by positive centers or holes as in p-type semiconductors.

The term "single crystal" as employed in the present invention refers to crystalline material in which the said single crystals have gross physical dimensions such that at least one dimension of the crystalline product is at least 0.1 mm.

The following examples illustrate specific embodiments of this invention.

*Example 1*

A charge of 1.54 g. of a mixture containing a 50 wt. percent—50 wt. percent $B_2O_3$—B mixture (B/O atomic ratio, 2.80) is placed in a graphite cell so designed that argon passes through the cell over the charge. This cell is placed in a graphite liner in a mullite tube inserted in a Globar furnace. Argon is passed through the cell at approximately 10 ml./min. The temperature of the reactor is raised to 1,400° C. and a stream of argon containing phosphorus vapor (argon 10 ml./min., $P_4$ about 2 ml./min.) is passed through the concentric space between the cell containing $B_2O_3$ and B and the graphite liner surrounding it. After the reaction has proceeded for 23 hours, the reactor is cooled to room temperature. The boron phosphide product is deposited as transparent red crystals adhering to the surface of the graphite liner downstream from the reactor cell. The composition of the product is BP. Single-crystal resistivity measurements on this material show it to have a resistivity of 1 ohm-cm. Hall-effect measurements show it to have about $10^{17}$ n-type carriers per cubic centimeter. This product is suitable for use in electronic applications as an n-type semiconductor.

*Example 2*

A stream of argon (10 ml./min.) containing $B_2O_2$ vapor is led into one leg of a Y-tube and a stream of argon containing phosphorus vapor (argon, 10 ml./min.; $P_4$ vapor about 2 ml./min.) is led into a second leg while the entire Y-tube is maintained at 1,400° C. The product, consisting of transparent crystals of cubic boron phosphide, is deposited along the walls of the third leg of the Y-tube. These crystals exhibit n-type semiconduction.

What is claimed is:
1. Process for the production of cubic crystalline boron phosphide which comprises contacting a gaseous stream of a boron suboxide having the formula $(BO)_x$, where $x$ is an integer with a gaseous stream of elemental phosphorus at a temperature in the range of from 1,000° C. to 1,800° C. and precipitating the said boron phosphide from the gas phase.

2. Process for the production of cubic crystalline boron phosphide in a single crystal form which comprises contacting a gaseous stream of a boron suboxide having the formula $(BO)_x$, where $x$ is an integer with a gaseous stream of elemental phosphorus at a temperature in the range of from 1,000° C. to 1,800° C. and precipitating the said boron phosphide from the gas phase.

3. Process for the production of single crystals of n-type boron phosphide which comprises contacting a gaseous stream of boron suboxide, $B_2O_2$, with a gaseous stream of elemental phosphorus at a temperature in the range of from 1,000° C. to 1,800° C. and precipitating the said boron phosphide from the gas phase.

4. Process for the production of single crystals of cubic boron phosphide which comprises contacting a gaseous stream of boron suboxide, $B_2O_2$, the said boron suboxide being produced by the reaction of boric oxide, $B_2O_3$, with a reducing element selected from the group consisting of boron, carbon, aluminum and silicon, with a gaseous stream of elemental phosphorus at a temperature in the range of from 1,000° C. to 1,800° C. and precipitating the said boron phosphide from the gas phase.

5. Process for the production of single crystals of boron phosphide which comprises contacting a gaseous stream of boron suboxide, $B_2O_2$, the said boron suboxide being produced by the reaction of boric oxide, $B_2O_3$, with elemental boron, with a gaseous stream of elemental phosphorus at a temperature in the range of from 1,000° C. to 1,800° C. and precipitating the said boron phosphide from the gas phase.

6. Process as in claim 1 in which an inert carrier gas is employed to convey the boron suboxide and the phosphorus.

7. Process as in claim 6 in which the inert carrier gas is argon.

References Cited in the file of this patent

UNITED STATES PATENTS 2,862,787   Sequin et al. _____ Dec. 2, 1958

FOREIGN PATENTS 435,754   Great Britain _____ Sept. 23, 1935

OTHER REFERENCES

Popper et al.: "Nature," vol. 179, p. 1075 (1957).
Kanda et al.: "Journal of The American Chemical Society," vol. 78, pp. 1509–1510 (1956).
Mellor: "Comprehensive Treatise on Inorganic and Theoretical Chemistry," 1924, vol. 5, page 39.